US012774068B2

(12) United States Patent
Farber et al.

(10) Patent No.: US 12,774,068 B2
(45) Date of Patent: Oct. 27, 2026

(54) AUTONOMOUS ASCENT OF AN UNDERWATER VEHICLE

(71) Applicant: Elta Systems Ltd., Ashdod (IL)

(72) Inventors: Amit Farber, Rosh Ha'ayin (IL); Sela Meyouhas, Kfar Yona (IL); Ehud Erell, Herzliya (IL)

(73) Assignee: ELTA SYSTEMS LTD., Ashdod (IL)

( * ) Notice: Subject to any disclaimer, the term of this patent is extended or adjusted under 35 U.S.C. 154(b) by 38 days.

(21) Appl. No.: 18/724,311

(22) PCT Filed: Dec. 29, 2022

(86) PCT No.: PCT/IL2022/051410
§ 371 (c)(1),
(2) Date: Jun. 26, 2024

(87) PCT Pub. No.: WO2023/126939
PCT Pub. Date: Jul. 6, 2023

(65) Prior Publication Data

US 2025/0066001 A1 Feb. 27, 2025

(30) Foreign Application Priority Data

Dec. 30, 2021 (IL) .......................................... 290030

(51) Int. Cl.
*B63G 8/24* (2006.01)
*B63G 8/39* (2006.01)
(Continued)

(52) U.S. Cl.
CPC ................. *B63G 8/24* (2013.01); *B63G 8/39* (2013.01); *G05D 1/485* (2024.01);
(Continued)

(58) Field of Classification Search
CPC .......... B63G 8/24; B63G 8/38; G05D 1/0875; G05D 1/0692; A63H 23/04; H04B 13/02; B63B 15/00; F42B 19/00
See application file for complete search history.

(56) References Cited

U.S. PATENT DOCUMENTS 3,003,450 A * 10/1961 Brand .................. G05D 1/0692 114/144 R
4,919,637 A * 4/1990 Fleischmann .......... A63H 23/04 446/155
(Continued)

FOREIGN PATENT DOCUMENTS

CA 1337913 C * 1/1996 ........... G05D 1/0875
CN 107064158 A 8/2017
(Continued)

*Primary Examiner* — Yuri Kan
(74) *Attorney, Agent, or Firm* — Ballard Spahr LLP

(57) ABSTRACT

There is provided a computerized method of controlling ascent of an underwater vehicle (UV) from a safety depth to a water surface, the method comprising: at safety depth, controlling the UV to collect, from a passive sonar associated with the UV, first data indicative of first locations of surface targets within a first surface area of interest; controlling ascent of the UV to an intermediate depth in accordance with the first data; at the intermediate depth, controlling the UV to collect second data indicative of second locations of surface targets within a second surface area of interest, wherein the second data comprises one or more of: data from a passive sonar, data from one or more magnetic sensors, data from an active sonar, data from a light detection and ranging (LIDAR) scanner; and controlling ascent of the UV to a periscope depth in accordance with the second data.

17 Claims, 7 Drawing Sheets

(51) Int. Cl.

| | |
|---|---|
| ***G05D 1/485*** | (2024.01) |
| ***G05D 109/30*** | (2024.01) |
| ***G05D 111/10*** | (2024.01) |
| ***G05D 111/20*** | (2024.01) |
| ***G05D 111/30*** | (2024.01) |

(52) U.S. Cl.

CPC ...... *G05D 2109/38* (2024.01); *G05D 2111/17* (2024.01); *G05D 2111/20* (2024.01); *G05D 2111/30* (2024.01)

(56) References Cited

U.S. PATENT DOCUMENTS

| | | | | |
|---|---|---|---|---|
| 5,406,488 | A * | 4/1995 | Booth | G05D 1/0875 701/1 |
| 7,345,705 | B2 * | 3/2008 | Croasdale | B63G 8/38 348/E7.087 |
| 10,202,173 | B2 * | 2/2019 | Farber | B63B 15/00 |
| 2004/0030449 | A1 | 2/2004 | Solomon | |
| 2006/0280034 | A1 * | 12/2006 | Howard | H04B 13/02 367/134 |
| 2014/0165898 | A1 | 6/2014 | Cierpka et al. | |

FOREIGN PATENT DOCUMENTS

| | | | | |
|---|---|---|---|---|
| CN | 109446902 | A | 3/2019 | |
| CN | 113033119 | A | 6/2021 | |
| EP | 0691264 | A1 * | 1/1996 | F42B 19/00 |
| EP | 3388327 | A1 | 10/2018 | |
| KR | 20180007827 | A | 1/2018 | |
| KR | 102054153 | B1 | 12/2019 | |

* cited by examiner

AUTONOMOUS ASCENT OF AN UNDERWATER VEHICLE

TECHNICAL FIELD

The presently disclosed subject matter relates to autonomous vehicles, and in particular to methods of controlling ascent of an autonomous underwater vehicles.

BACKGROUND

Problems of implementation in autonomous underwater vehicles have been recognized in the conventional art and various techniques have been developed to provide solutions.

GENERAL DESCRIPTION

According to one aspect of the presently disclosed subject matter there is provided a processing circuitry-based method of method of controlling ascent of an underwater vehicle (UV) from a safety depth to a water surface, the method comprising:

a) at the safety depth, controlling the UV to collect, from a passive sonar associated with the UV, first data indicative of first locations of surface targets within a first surface area of interest;

b) controlling ascent of the UV to an intermediate depth in accordance with, at least, the first data;

c) at the intermediate depth, controlling the UV to collect second data indicative of second locations of surface targets within a second surface area of interest, wherein the second data comprises one or more of:

a. data from a passive sonar associated with the UV, b. data from one or more magnetic sensors associated with the UV, c. data from an active sonar associated with the UV, and d. data from a light detection and ranging (LIDAR) scanner associated with the UV;

d) controlling ascent of the UV to a periscope depth in accordance with, at least, the second data, wherein: the safety depth is not less than 15 meters beneath the surface, the intermediate depth is not less than 5 meters below the surface, and the periscope depth is less than 8 meters below the surface.

In addition to the above features, the method according to this aspect of the presently disclosed subject matter can comprise one or more of features (i) to (xiv) listed below, in any desired combination or permutation which is technically possible:

(i) the method additionally comprising:

e) controlling ascent of the UV to the surface, in accordance with, at least, data from at least one mast-based sensor.

(ii) the at least one mast-based sensor includes at least one sensor from a group consisting of: an optical sensor, and a radar sensor.

(iii) controlling ascent of the UV to the intermediate depth comprises:

initiating ascent, responsive to determining, from the first data, a surfacing zone from which detected surface targets are absent at a time of the collecting.

(iv) the controlling ascent of the UV to the intermediate depth comprises:

initiating ascent, responsive to determining, from the first data, a surfacing zone from which detected surface targets are absent at a time subsequent to a time of the collecting.

(v) the controlling ascent of the UV to an intermediate depth comprises:

delaying ascent, responsive to failure to detect, from the first data, a surfacing zone in which detected surface targets are absent at a time of the collecting.

(vi) the controlling ascent of the UV to the periscope depth comprises:

initiating ascent, responsive to determining, from the second data, a surfacing zone from which detected surface targets are absent at a time of the collecting.

(vii) the controlling ascent of the UV to the periscope depth comprises:

initiating ascent, responsive to determining, from the second data, a surfacing zone from which detected surface targets are absent at a time subsequent to a time of the collecting.

(viii) the determining the surfacing zone is in accordance with: respective detected locations, respective detected directions, and respective detected velocities of the surface targets.

(ix) the determining the surfacing zone is in further accordance with respective target-specific minimum distances.

(x) the controlling ascent of the UV to periscope depth comprises:

delaying ascent, responsive to failure to detect, from the second data, a surfacing zone in which detected surface targets are absent at a time of the collecting.

(xi) the second data comprises data from a first magnetic sensor sensing in a upward direction and a second magnetic sensor sensing in a downward direction.

(xii) the second data comprises data from an active sonar that is a tiltable forward-looking sonar.

(xiii) the tiltable forward-looking sonar can sense sound from at least 45 degrees above horizontal.

(xiv) the second data comprises:

a. data from a passive sonar associated with the UV, b. data from one or more magnetic sensors associated with the UV, and c. data from an active sonar associated with the UV;

According to a further aspect of the presently disclosed subject matter there is provided a processing circuitry-based method of controlling ascent of an underwater vehicle (UV) from a safety depth to a water surface, the system comprising a processing circuitry configured to:

a) at the safety depth, control the UV to collect, from a passive sonar associated with the UV, first data indicative of first locations of surface targets within a first surface area of interest;

b) control ascent of the UV to an intermediate depth in accordance with, at least, the first data;

c) at the intermediate depth, control the UV to collect second data indicative of second locations of surface targets within a second surface area of interest, wherein the second data comprises one or more of:

a. data from a passive sonar associated with the UV, b. data from one or more magnetic sensors associated with the UV, c. data from an active sonar associated with the UV, and d. data from a light detection and ranging (LIDAR) scanner associated with the UV; and d) control ascent of the UV to a periscope depth in accordance with, at least, the second data, wherein: the safety depth is not less than 15 meters beneath the surface, the intermediate depth is not less than 5 meters below the surface, and the periscope depth is less than 8 meters below the surface.

This aspect of the disclosed subject matter can further optionally comprise one or more of features (i) to (xiv) listed above with respect to the system, mutatis mutandis, in any desired combination or permutation which is technically possible.

According to another aspect of the presently disclosed subject matter there is provided a computer program product comprising a non-transitory computer readable storage medium retaining program instructions, which, when read by a processing circuitry, cause the processing circuitry to perform a method of controlling ascent of an underwater vehicle (UV) from a safety depth to a water surface, the method comprising:

a) at the safety depth, controlling the UV to collect, from a passive sonar associated with the UV, first data indicative of first locations of surface targets within a first surface area of interest;
b) controlling ascent of the UV to an intermediate depth in accordance with, at least, the first data;
c) at the intermediate depth, controlling the UV to collect second data indicative of second locations of surface targets within a second surface area of interest, wherein the second data comprises one or more of:
    a. data from a passive sonar associated with the UV,
    b. data from one or more magnetic sensors associated with the UV,
    c. data from an active sonar associated with the UV, and
    d. data from a light detection and ranging (LIDAR) scanner associated with the UV;
d) controlling ascent of the UV to a periscope depth in accordance with, at least, the second data,
wherein: the safety depth is not less than 15 meters beneath the surface, the intermediate depth is not less than 5 meters below the surface, and the periscope depth is less than 8 meters below the surface.

This aspect of the disclosed subject matter can further optionally comprise one or more of features (i) to (xiv) listed above with respect to the system, mutatis mutandis, in any desired combination or permutation which is technically possible.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1A:
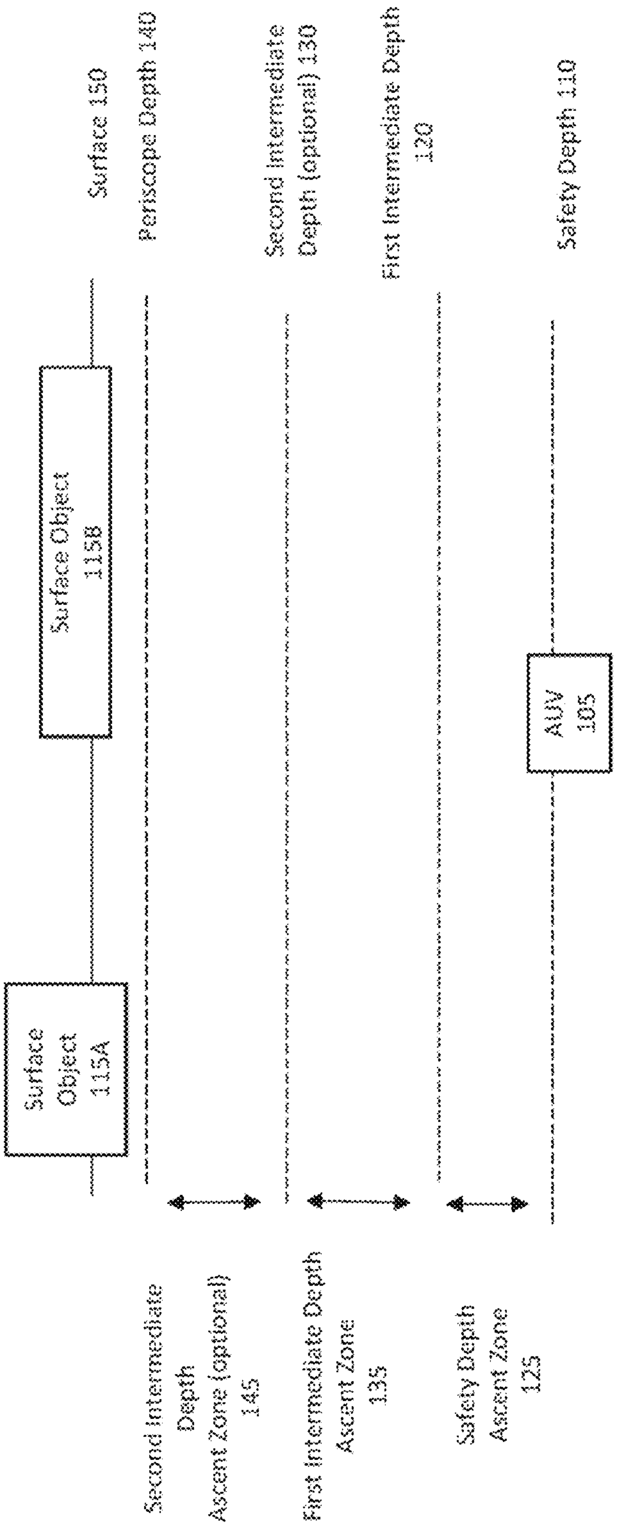
FIG. 1A which illustrates an example scenario of autonomous ascent of an autonomous underwater vehicle, in accordance with some embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as “processing”, “computing”, “comparing”, “steering”, “collecting”, “determining”, “calculating”, “receiving”, “providing”, “obtaining”, “scanning”, “ascending” or the like, refer to the action(s) and/or process(es) of a computer that manipulate and/or transform data into other data, said data represented as physical, such as electronic, quantities and/or said data representing the physical objects. The term “computer” should be expansively construed to cover any kind of hardware-based electronic device with data processing capabilities including, by way of non-limiting example, the processor, mitigation unit, and inspection unit therein disclosed in the present application.

The terms “non-transitory memory” and “non-transitory storage medium” used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

In existing deployments of autonomous underwater vehicles (AUVs), external control (e.g. from a ship on the surface, typically with human involvement) is required to ensure collision-free AUV ascent to the surface.

Human-guided surface-vehicle-based AUV can be viewed as an intuitive task that is performed by experienced personnel and not easily automated.

Autonomous AUV ascent (e.g. without assistance from a surface entity) is a desired feature.

Challenges of autonomously controlled ascent of an underwater vehicle include:

Wakes on the surface of the water, which may create noise and mask actual targets on the water surface and impede their detection Large objects (ships) that mask smaller objects and impede their detection False alarms due to the contour of the seabed, as well as other objects located on the seabed Difficulty in continuous tracking of detected targets in an environment densely populated with ships due to high false alarm rate Underwater sonars have various limitations:

Passive sonars can detect only targets which generate noise, so e.g. sailboats can't be detected passively Active sonars can typically detect only vessels that are typically large Forward-looking Sonars (FLS) are typically limited to very close ranges.

In some embodiments of the presently disclosed subject matter, an AUV includes an autonomous ascent system which utilizes phased ascent and detections, differentiates between real objects and noise and tracks objects, and performs final ascent in a manner that allows rapid descent upon optical and/or radar detection of objects at the surface.

In some embodiments of the presently disclosed subject matter, autonomous AUV ascent is stealthful i.e. utilizes mechanisms that avoid detection by other parties.

Figure 4:
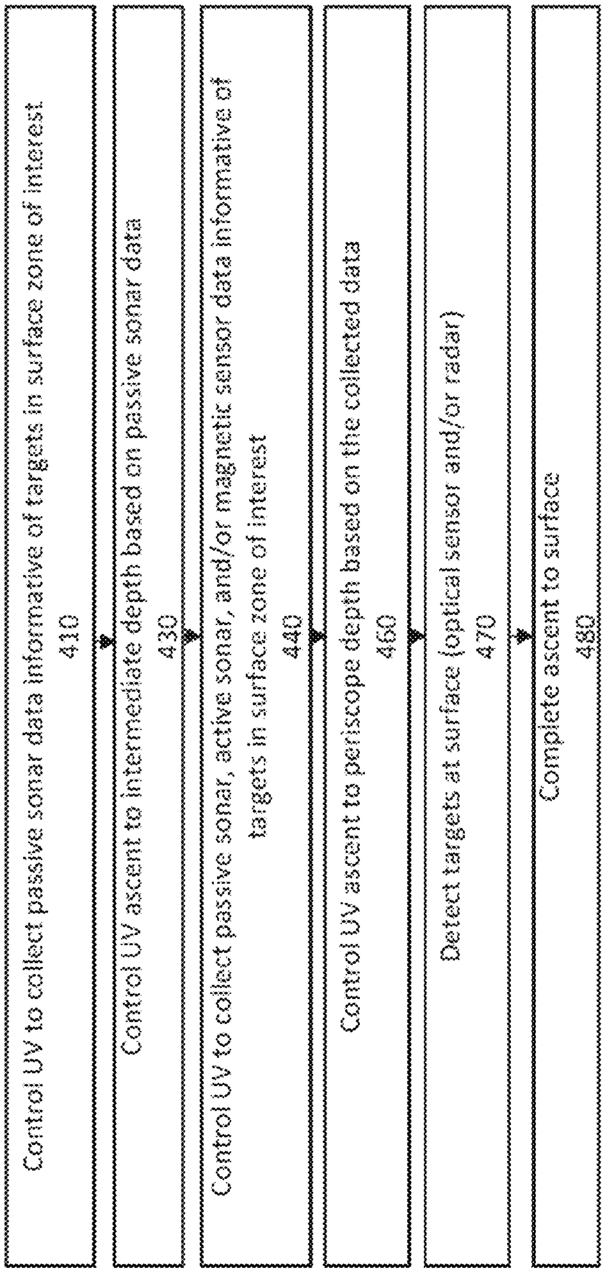
FIG. 4, illustrates a flow diagram of an example method of ascent of an autonomous underwater vehicle, in accordance with some embodiments of the presently disclosed subject matter.

In the description hereinbelow, FIGS. 1A-1E illustrate example stages of autonomous ascent. FIG. 2 illustrates an example AUV with relevant detection systems, and FIGS. 4, 5A, and 5B illustrate flow diagrams of example methods utilizing the detection systems and ascent phases.

Figure 2:
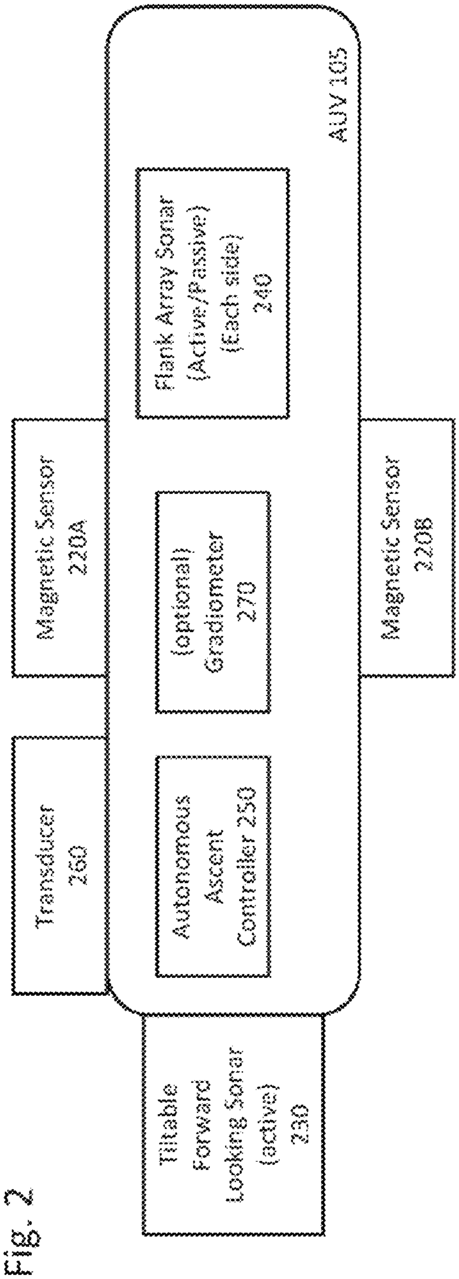
FIG. 2, illustrates a block diagram of an AUV with autonomous ascent capability, in accordance with some embodiments of the presently disclosed subject matter.

Attention is directed to FIG. 1A which illustrates an example scenario of autonomous ascent of an autonomous underwater vehicle (AUV) 105, in accordance with some embodiments of the presently disclosed subject matter.

Safety depth 110 can be a depth at which AUV 105 generally travels and at which there are generally no obstacles. In some examples, safety depth 110 can be not less than 15 meters beneath surface 150 to effectively avoid collisions (e.g. 20 meters beneath surface 150).

Periscope depth 130 can be a depth at which AUV 105 can extend radar and/or optical scanning equipment above water. In some examples, periscope depth 110 can be less than 8 meters beneath surface 150 (e.g. 3 meters beneath surface 150).

Various surface objects 115A 115B (e. g. ships) can be stationed or moving on or near surface 150. When autonomously ascending, AUV 105 can attempt to avoid these objects, thereby obviating the need for assisted ascent.

AUV 105 can autonomously ascend in stages. In some embodiments, AUV 105 initially assesses whether ascent will be collision-safe, and then ascends from safety depth 110 to first intermediate depth 120. AUV 105 can then assess whether the remainder of the ascent will be collision-safe, and then ascend from first intermediate depth 120 to periscope depth 120. AUV 105 can then perform a final assessment of whether ascending to surface 150 is collision-safe. If, at any stage, AUV 105 assesses a likelihood of collision, AUV 105 can either remain at its current depth or descend to a different depth.

In some other embodiments, AUV 105 ascends from first intermediate depth 120 to second intermediate depth 120, performs an additional assessment of collision-safety, and then ascends to periscope depth 140.

In some embodiments, the intermediate depth from which AUV 105 performs an assessment of collision-safety (i.e. before initiating ascent to periscope depth) can be not less than 5 meters (so as to effectively avoid collisions).

Figure 1B:
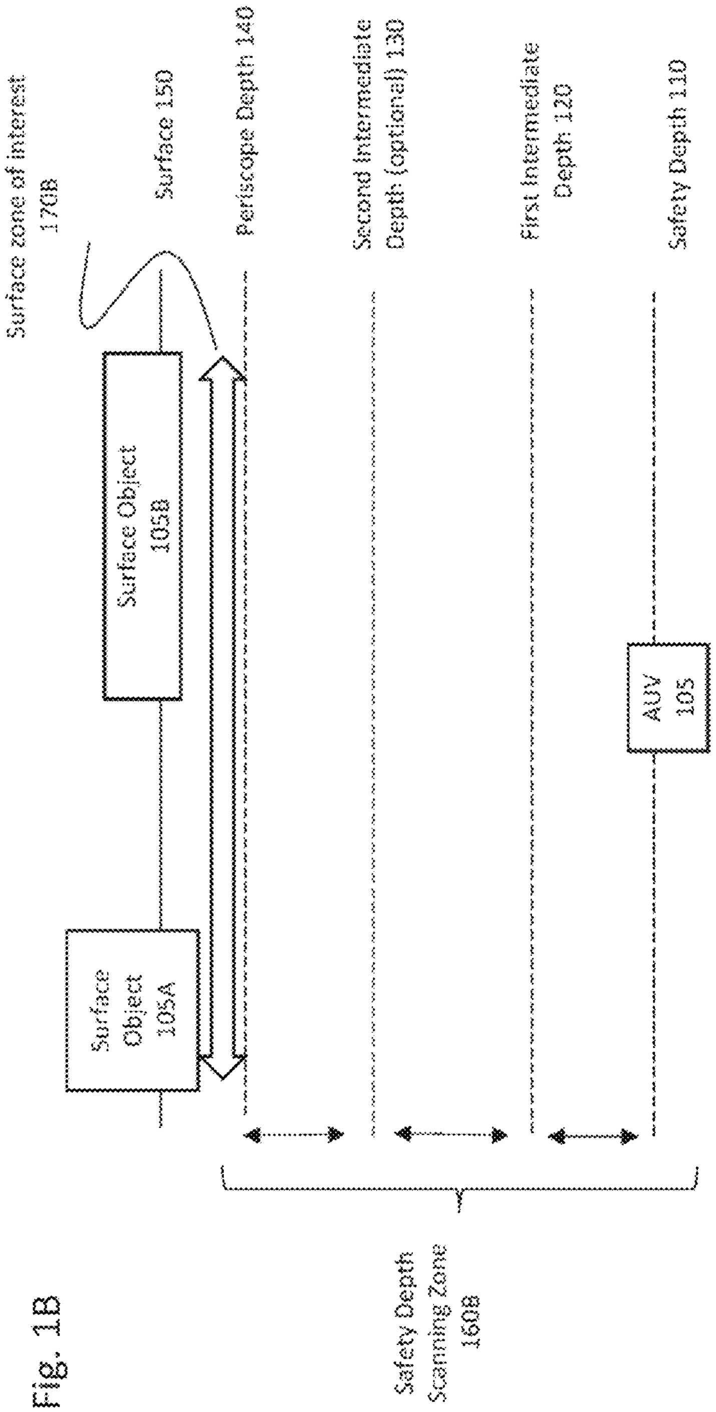
FIG. 1B illustrates an example surface zone of interest during autonomous ascent of an autonomous underwater vehicle, in accordance with some embodiments of the presently disclosed subject matter.
Figure 1C:
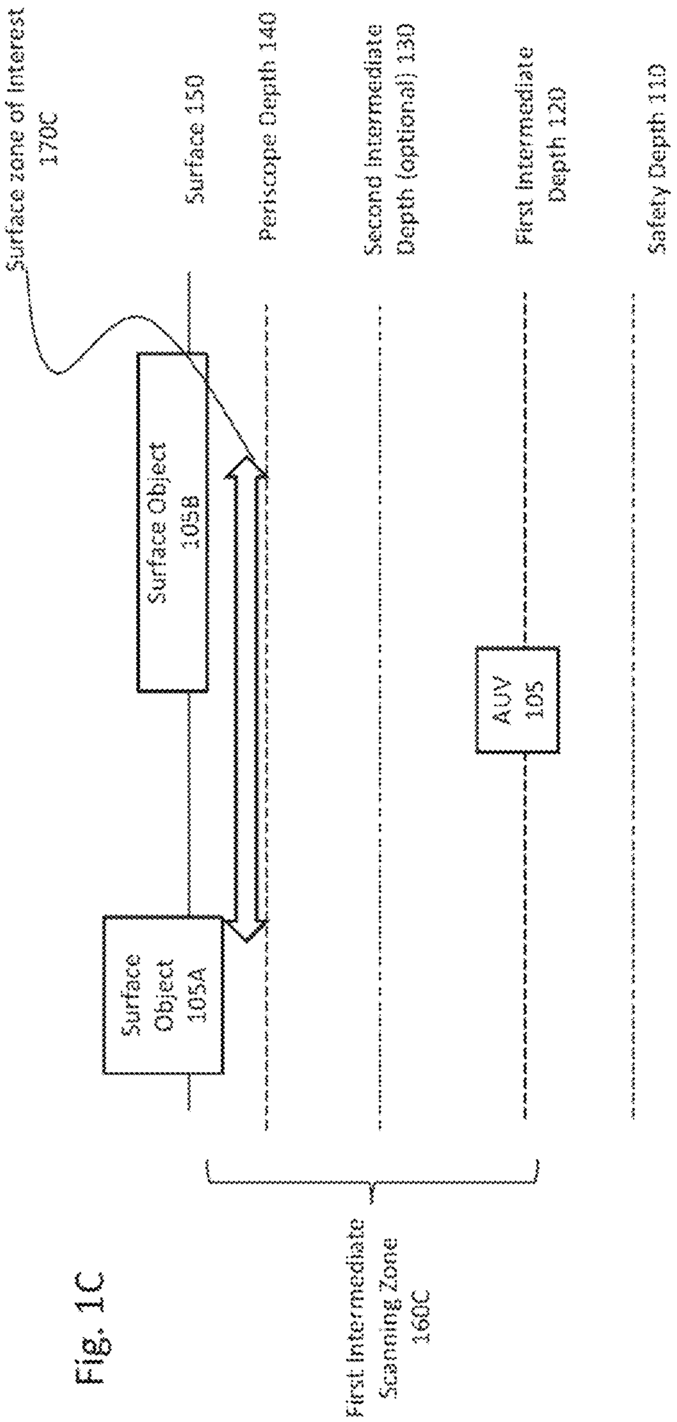
FIG. 1C illustrates an example surface zone of interest during autonomous ascent of an autonomous underwater vehicle, in accordance with some embodiments of the presently disclosed subject matter.
Figure 1D:
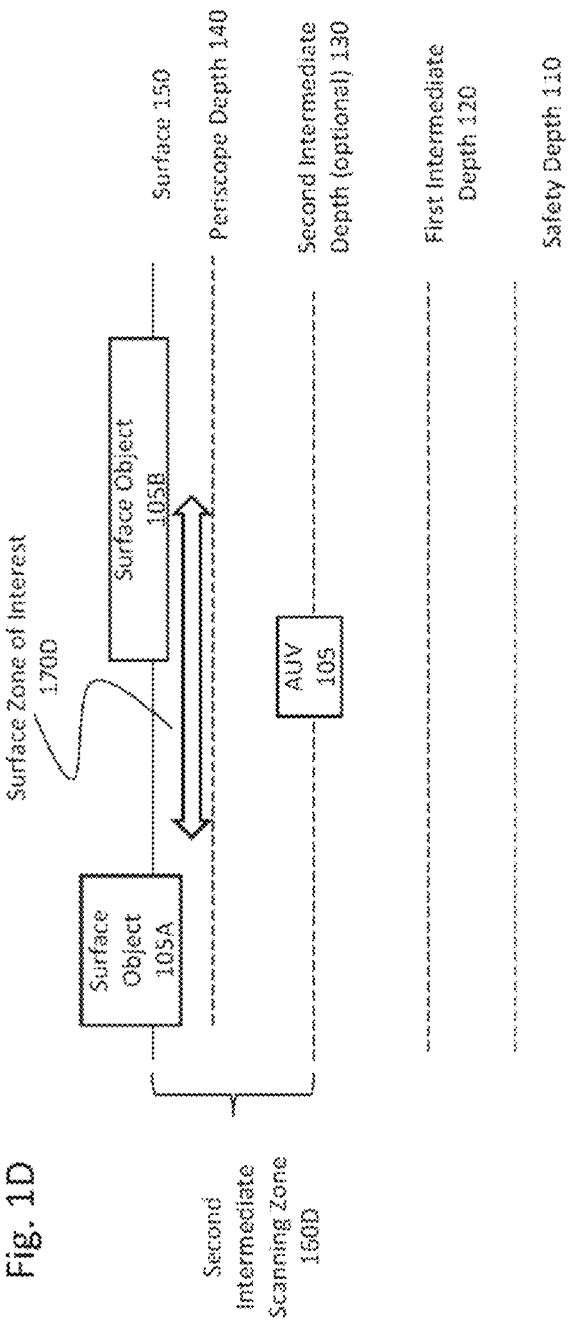
FIG. 1D illustrates an example surface zone of interest during autonomous ascent of an autonomous underwater vehicle, in accordance with some embodiments of the presently disclosed subject matter.

Attention is directed to FIGS. 1B-1D which illustrate example surface zones of interest during autonomous ascent of an autonomous underwater vehicle (AUV) 105, in accordance with some embodiments of the presently disclosed subject matter.

FIG. 1B illustrates a surface zone of interest 170B. Safety depth scanning zone 160B is associated with surface zone of interest 170B. At safety depth, surface zone of potential collision 170B is comparatively large, as AUV 105 needs to detect surface objects 105A 105B in a comparatively large area, as these might move towards AUV 105 during its ascent. In some embodiments, AUV 105 can utilize a value larger than 1kilometer (km) (e.g. 2 km) as a diameter of surface zone of interest 170B when at safety depth.

FIG. 1C illustrates a narrower surface zone of interest 170C. First intermediate scanning zone 160C is associated with surface zone of interest 170C. surface zone of interest 170C is smaller than at safety depth 110, as the range in which surface objects 105A 105B can interfere with ascent is reduced. In some embodiments, AUV 105 can utilize a value larger than 0.5 kilometer (km) (e.g. 1 km) as the diameter of the surface zone of interest when at first intermediate depth.

FIG. 1D illustrates an optional second intermediate surface zone of interest 170D, and shows how its size is reduced further.

Figure 1E:
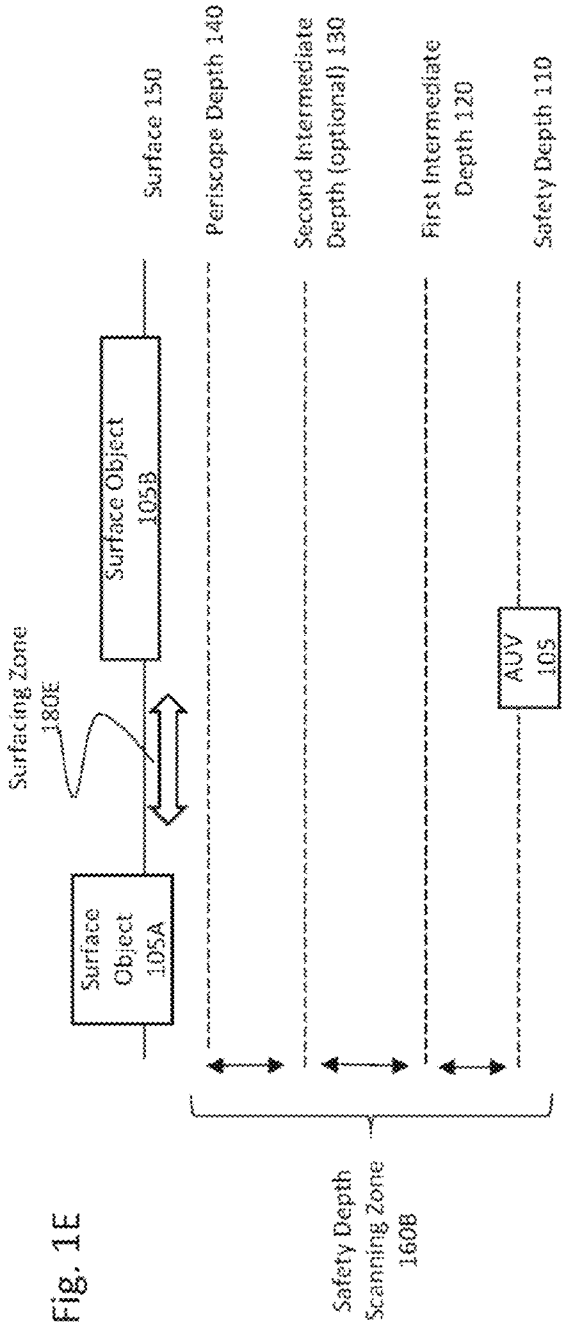
FIG. 1E illustrates an example surfacing zone that can be identified by an AUV from safety depth.

FIG. 1E illustrates a surfacing zone 180E that can be identified by AUV 105 from safety depth 110. Surfacing zone 180E can be a zone that is free of detected targets, and thus an appropriate place for AUV 105 to emerge above surface 150.

Attention is directed to FIG. 2, which illustrates a block diagram of an AUV with autonomous ascent capability, in accordance with some embodiments of the presently disclosed subject matter.

In some embodiments, AUV 105 is composed of a non-magnetic material e.g. aluminum or fiberglass, so as to reduce the magnetic signature and facilitate use of magnetic sensors (which would be disrupted if AUV 105 had substantially metallic composition). In some embodiments, AUV 105 is of comparatively small size (e.g. 1.5 meters in diameter), thereby enabling it to operate at a safety depth of e.g. 15-20 m. Larger submarines can be required to operate at a lower safety depth (e.g. 40 m).

Flank Array Sonar (FAS) 240 can be a passive or active/passive sonar that consists of 2 arrays—one on each side of AUV 105. The arrays can be operably connected to transducer 260 for use in active mode.

When used in passive mode, FAS 240 can receive ambient sound in order to detect the presence of sound-generating objects such as an engine or a ship in motion. FAS 240 can have a range of detection that is—for example—as high as 1-2 kilometers (km) or more.

It is noted that—in some embodiments—an area of about 15 degrees behind AUV 105 may be inaccessible to FAS 240. Thus it can be necessary to turn the vehicle in order to scan this area.

In some embodiments, FAS 240 in passive mode is unable to provide information indicative of the specific direction of a detected object. Accordingly, AUV 105 can travel in a manner that enables FAS 240 to gather sonar data from multiple locations and perform analysis of the data so as to locate and track targets. Travelling in this manner is herein termed a "scanning maneuver".

In some embodiments, FAS 240 in passive mode performs—for example—target motion analysis to determine distances and directions to detected objects.

In some embodiments, the detection envelope of FAS 240 is ring-shaped or tubed-shaped and encircles AUV 105. To avoid detection of objects below or lateral to AUV 105, FAS 240 can utilize an appropriate threshold based on a noise level measured in the platform area.

In some embodiments, FAS 240 can operate in active mode. By way of non-limiting example, FAS 240 can perform active sonar detection by operating in tandem with transducer 260. FAS 240 in active mode can operate at a lower frequency than Tiltable Forward Looking Sonar 230, and can thereby have a longer range. In some embodiments, FAS 240 in active mode can generate a directed pulse.

FAS 240 can be operably connected to an autonomous tracker (not shown). The autonomous tracker can include a tracking algorithm which identifies objects and tracks their motion. In some embodiments, FAS 240 includes an algorithm (e.g. an algorithm based on a Fourier Transform or on machine learning) that distinguishes targets such as ships from other detected objects (e.g. wakes etc.).

In some embodiments, the autonomous tracker can determine maneuvers to be taken by AUV 105 in order to e.g. scan the rear blind area or determine locations of targets. In some embodiments, the autonomous tracker is collocated or integrated with FAS 240. In some embodiments, the autonomous tracker is collocated or integrated with autonomous ascent controller 250.

Tiltable Forward Looking Sonar (FLS) 230 can be an active sonar located on the front of AUV 105 that detects objects in the path of AUV 105 as it moves underwater horizontally.

In many prior art systems, forward looking sonar is used to ensure that no obstacles impede forward movement of the vehicle. In some embodiments of the presently disclosed subject matter, tiltable FLS 230 is additionally utilized to detect objects above AUV 105, and thereby enable autonomous ascent. In many prior art systems, the forward looking sonar can have a detection range of e.g. tens of meters—which can be sufficient for avoiding collisions in forward movement.

In order to additionally detect potentially colliding surface targets from e.g. intermediate depth, tiltable FLS 230 can be equipped with a mechanical or electronic method that enables it to direct sonar pulses in an upward direction. Tiltable FLS 230 can have a range of—for example—200 meters. Accordingly tiltable FLS 230 can have an appropriately strong transmitter. In some embodiments, tiltable FLS 230 can sense sound from at least 45 degrees above horizontal.

Magnetic sensor 220A can be attached to an upper surface of AUV 105 and be configured to sense upward. Magnetic sensor 220B can be attached to a lower surface of AUV 105 and be configured to sense downward. Magnetic sensors 220A 220B can be—for example—magnetometers which measure magnetic signals according to the proximity of metallic objects. Each magnetic sensors 220A 220B can have a detection range of, for example, 50 to 500 meters.

In some embodiments, magnetic sensors 220A 220B are part of optional gradiometer 270, which can reduce the noise level of the magnetic sensor signal. Magnetic sensors 220A 220B can measure a magnetic field (e.g. field strength/field direction). Gradiometer 270 can evaluate the difference between two measurements to determine whether a detected object is above or below AUV 105.

AUV 210 can be equipped with a light detection and ranging (LIDAR) sensor (not shown). The LIDAR sensor can be a green laser LIDAR, which enables detection of small or thin underwater objects (such as fishing nets or plastic rope). The LIDAR sensor can have a range of e.g. 100 meters.

Autonomous ascent controller 250 can be equipped with an object detection/classification algorithm utilizing the FLS active sonar data pertaining to zone above it. In some embodiments, this algorithm can also do target tracking. By way of non-limiting example, a three-layer method can be used a) Autonomous ascent controller 250 can employ a constant false alarm rate detector to take into account a cluttered environment b) Autonomous ascent controller 250 can then apply a deep learning network is to exclude detections from clutter.

c) Autonomous ascent controller 250 can then apply a geometrical-blob-based classifier.

Autonomous ascent controller 250 can utilize the FAS passive sonar data to detect and track targets in the zone above.

Figure 3:
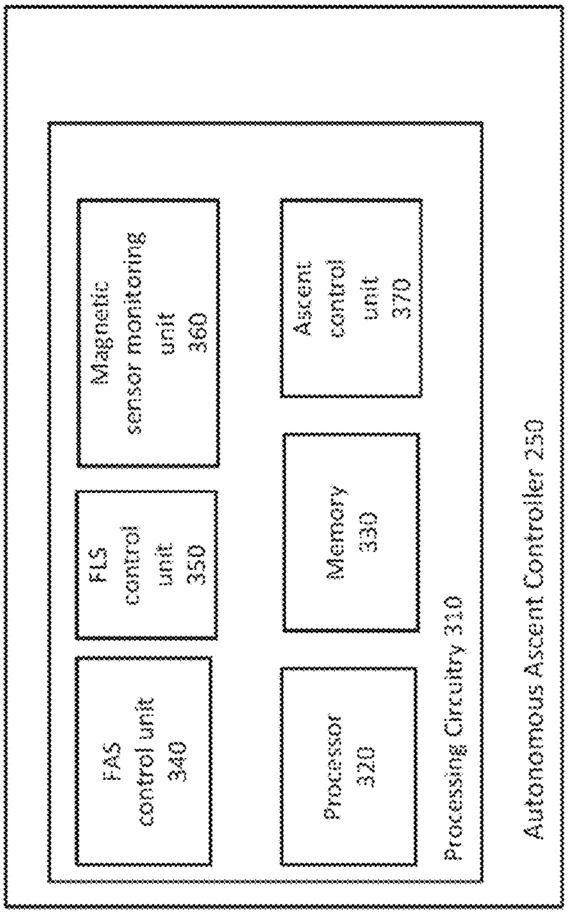
FIG. 3, illustrates a logical block diagram of an example autonomous ascent controller system, in accordance with some embodiments of the presently disclosed subject matter.

Attention is now directed to FIG. 3, which illustrates a logical block diagram of an example autonomous ascent controller system, in accordance with some embodiments of the presently disclosed subject matter.

Autonomous ascent controller 250 can include a processing circuitry 310. Processing circuitry 310 can include a processor 320 and a memory 330.

Processor 320 can be a suitable hardware-based electronic device with data processing capabilities, such as, for example, a general purpose processor, digital signal processor (DSP), a specialized Application Specific Integrated Circuit (ASIC), one or more cores in a multicore processor etc. Processor 320 can also consist, for example, of multiple processors, multiple ASICs, virtual processors, combinations thereof etc.

Memory 330 can be, for example, a suitable kind of volatile and/or non-volatile storage, and can include, for example, a single physical memory component or a plurality of physical memory components. Memory 330 can also include virtual memory. Memory 330 can be configured to, for example, store various data used in computation.

Processing circuitry 310 can be configured to execute several functional modules in accordance with computer-readable instructions implemented on a non-transitory computer-readable storage medium. Such functional modules are referred to hereinafter as comprised in the processing circuitry. These modules can include, for example, flank array sonar control unit 340, forward-looking sonar control unit 350, and magnetic sensor monitoring unit 360, and ascent control unit 370.

Attention is now directed to FIG. 4, which illustrates a flow diagram of an example method of ascent of an autonomous underwater vehicle, in accordance with some embodiments of the presently disclosed subject matter.

One challenge of autonomous UV ascent is preventing collisions with targets at or near the water surface.

Accordingly, at safety depth, autonomous ascent controller 250 can seek to identify targets in a wide surface zone of interest (for example: diameter of 2 km), in order to have awareness of targets that may be moving towards a potential surfacing zone. Similarly, autonomous ascent controller 250 can seek to identify targets that are currently located in a potential surfacing zone, including targets that may soon move out of the potential surfacing zone.

To identify surface targets over a large area, processing circuitry 310 (e.g. ascent control unit 370) can utilize wide-area passive sonar to receive sound from noise-generating targets (such as an engine or a moving ship).

Accordingly, when an AUV 105 is at safety depth, processing circuitry 310 (e.g. ascent control unit 370) can control (410) the AUV 105 to collect passive sonar data that is informative of the presence of targets within an initial surface zone of interest. The collected passive sonar can also be more generally be informative of any sound-generating targets at any depth of safety depth scanning zone 160B.

By way of non-limiting example, processing circuitry 310 (e.g. ascent control unit 370) can perform a scanning maneuver such as steering AUV 105 in a u-shaped or other pattern so as to:

a) receive data from blind spots (such as the rear area in some types of AUV 105 as described above with reference to FIG. 2)

b) receive data from a series of positions so as to be able to locate and track the surface targets (as described above with reference to FIG. 2). Tracking the surface targets enables processing circuitry 310 (e.g. ascent control unit 370) to determine a surfacing zone based on future locations of the targets.

In some embodiments, processing circuitry 310 (e.g. ascent control unit 370) confirms the presence of identified targets by using passive sonar in active mode (for example: by utilizing transducer 260).

Processing circuitry 310 (e.g. ascent control unit 370) can next control (430) AUV 105 ascent to intermediate depth 120 in accordance with the collected passive sonar data.

In some embodiments, processing circuitry 310 (e.g. ascent control unit 370) analyzes the collected passive sonar data to determine whether there is a surfacing zone that is clear of detected targets at the time of the collecting the data, and controls AUV 105 accordingly to initiate ascent.

In some embodiments, processing circuitry 310 (e.g. ascent control unit 370) determines whether there is a surfacing zone that is clear of detected targets at the time subsequent to the time of the collecting the data (e.g. at an estimated time of AUV 105 arriving at the surfacing zone). Processing circuitry 310 (e.g. ascent control unit 370) can perform this determination in accordance with respective detected locations, respective detected directions, and respective detected velocities of the surface targets. Processing circuitry 310 (e.g. ascent control unit 370) can control AUV 105 accordingly to initiate ascent.

In some embodiments, processing circuitry 310 (e.g. ascent control unit 370) controls AUV 105 to steer it toward the determined surfacing zone.

In some embodiments, processing circuitry 310 (e.g. ascent control unit 370) utilizes the collected passive sonar data in another suitable manner—for example: by steering AUV 105 away from noise sources.

It is noted that processing circuitry 310 (e.g. ascent control unit 370) can—for example—perform additional scanning maneuvers and collect additional passive sonar data, or perform additional descents and re-ascents before arrival at intermediate depth 120.

In some embodiments, processing circuitry 310 (e.g. ascent control unit 370) can, responsive to failure to detect a current surfacing zone clear of detected targets, postpone ascent. In some embodiments, processing circuitry 310 (e.g. ascent control unit 370) can, responsive to failure to detect a future surfacing zone clear of detected targets, postpone ascent.

It is noted that processing circuitry 310 (e.g. ascent control unit 370) can use other information in conjunction with the collected passive sonar data to control AV ascent.

At intermediate depth, processing circuitry 310 (e.g. ascent control unit 370) can—in preparation for ascent to periscope depth attempt to detect targets in the region directly above AUV 105. Moreover, the surface zone of interest 170C is smaller (e.g. 500-800 m). Accordingly autonomous ascent controller 250 can seek to identify targets in the narrower surface zone of interest using passive sonar, active sonar, and magnetic detection. In some embodiments, autonomous ascent controller 250 utilizes at least one of a group consisting of: passive sonar, active sonar, magnetic detection, and LIDAR.

Thus, at intermediate depth, processing circuitry 310 (e.g. ascent control unit 370) can control the AUV 105 to collect (440) second data that is informative of the presence of targets within a surface zone of interest. The second data can include one or more of:

a. passive sonar data (e.g. as described above for safety depth)

b. magnetic sensor data (e.g. from gradiometer 270), and c. active sonar data (e.g. from tiltable forward-looking sensor 230)

d. LIDAR (e.g. green laser LIDAR (not shown)).

By way of non-limiting example, processing circuitry 310 (e.g. ascent control unit 370) can perform a scanning maneuver such as steering AUV 105 in a u-shaped or other pattern so as to:

a) receive data from blind spots (such as the rear area in some types of AUV 105 as described above with reference to FIG. 2)

b) receive data from a series of positions so as to be able to locate and track the surface targets (as described above with reference to FIG. 2). Tracking the surface targets enables processing circuitry 310 (e.g. ascent control unit 370) to determine a surfacing zone based on future locations of the targets.

Processing circuitry 310 (e.g. ascent control unit 370) can next control (460) AUV 105 ascent to periscope depth 140 based on the second data.

In some embodiments, processing circuitry 310 (e.g. ascent control unit 370) analyzes the second data do determine whether there is (or whether there will be) a surfacing zone clear of targets, and controls AUV 105 accordingly.

In some embodiments, processing circuitry 310 (e.g. ascent control unit 370) determines whether there is a surfacing zone that is clear of detected targets at the time subsequent to the time of the collecting the data (e.g. at an estimated time of AUV 105 arriving at the surfacing zone). Processing circuitry 310 (e.g. ascent control unit 370) can perform this determination in accordance with respective detected locations, respective detected directions, and respective detected velocities of the surface targets. Processing circuitry 310 (e.g. ascent control unit 370) can control AUV 105 accordingly to initiate ascent to periscope dtph.

In some embodiments, processing circuitry 310 (e.g. ascent control unit 370) utilizes the second data in another suitable manner—for example: by postponing ascent until all sensors indicate absence of targets in the surface zone of interest.

In some embodiments, processing circuitry 310 (e.g. ascent control unit 370) makes a determination to ascend to periscope depth only if there are no targets within a "one minute zone" of the point of ascent i.e. if processing circuitry 310 (e.g. ascent control unit 370) determines that a target could reach the ascent point with in one minute (given its detected current location, direction, and velocity), processing circuitry 310 (e.g.

ascent control unit 370) will not control AUV 105 to ascend. In some other embodiments, processing circuitry 310 (e.g. ascent control unit 370) uses a time other than one minute to make the determination of ascent.

The term "target-specific minimum distance" as used herein refers to a distance from a target at which the AUV 105 target must be located to ensure that the target cannot collide with AUV 105 within a given period of time (e.g. one minute—in the case of the "one minute zone")—given the target's location, direction and velocity. The period of time utilized can be statically or dynamically selected so at to provide AUV 105 with enough time to descend if AUV 105 detects proximate targets at the surface using optical sensors and/or radar sensors.

It is noted that processing circuitry 310 (e.g. ascent control unit 370) can—for example—perform additional scanning maneuvers and collect additional data, or perform additional descents and re-ascents before arrival at periscope depth 120.

In some embodiments, processing circuitry 310 (e.g. ascent control unit 370) can, responsive to failure to detect a current surfacing zone clear of detected targets, postpone ascent or initiate descent. In some embodiments, processing circuitry 310 (e.g. ascent control unit 370) can, responsive to failure to detect a future surfacing zone clear of detected targets, postpone ascent or initiate descent.

From periscope depth, processing circuitry 310 (e.g. ascent control unit 370) can detect (470) targets at surface e.g. using an optical sensor and/or radar sensor attached to a mast. If a proximate target is detected, processing circuitry 310 (e.g. ascent control unit 370) can control AUV 105 to descend.

Finally, processing circuitry 310 (e.g. ascent control unit 370) can, in the absence of detecting targets with the optical sensor and/or radar sensor, control (480) AUV 105 to complete ascent to surface.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of controlling ascent of an underwater vehicle (UV) from a safety depth to a water surface, the method being performed by a processing circuitry, the processing circuitry including a processor and memory, the method comprising:

a) at the safety depth, controlling the UV to collect first data, the first data being passive sonar data indicative of first locations of surface targets within a first surface area of interest;

b) controlling ascent of the UV to an intermediate depth in accordance with, at least, the first data;

c) at the intermediate depth, controlling the UV to collect second data indicative of second locations of surface targets within a second surface area of interest, wherein the second data comprises one or more of:

a. passive sonar data, b. magnetic sensor data, c. active sonar data, or d. light detection and ranging (LIDAR) data; and d) controlling ascent of the UV to a periscope depth in accordance with, at least, the second data, wherein: the safety depth is not less than 15 meters beneath the surface, the intermediate depth is not less than 5 meters below the surface, and the periscope depth is less than 8 meters below the surface.

2. The method of claim 1, the method additionally comprising:

e) controlling ascent of the UV to the surface, in accordance with, at least, data from at least one mast-based sensor.

3. The method of claim 2 wherein the at least one mast-based sensor includes at least one sensor from a group consisting of: an optical sensor, and a radar sensor.

4. The method of claim 1, wherein the controlling ascent of the UV to the intermediate depth comprises:

initiating ascent, responsive to determining, from the first data, a surfacing zone from which detected surface targets are absent at a time of the collecting.

5. The method of claim 1, wherein the controlling ascent of the UV to the intermediate depth comprises:

initiating ascent, responsive to determining, from the first data, a surfacing zone from which detected surface targets are absent at a time subsequent to a time of the collecting.

6. The method of claim 1, wherein the controlling ascent of the UV to the intermediate depth comprises:

delaying ascent, responsive to failure to detect, from the first data, a surfacing zone in which detected surface targets are absent at a time of the collecting.

7. The method of claim 1, wherein the controlling ascent of the UV to the periscope depth comprises:

initiating ascent, responsive to determining, from the second data, a surfacing zone from which detected surface targets are absent at a time of the collecting.

8. The method of claim 1, wherein the controlling ascent of the UV to the periscope depth comprises:

initiating ascent, responsive to determining, from the second data, a surfacing zone from which detected surface targets are absent at a time subsequent to a time of the collecting.

9. The method of claim 8, wherein the determining the surfacing zone is in accordance with: respective detected locations, respective detected directions, and respective detected velocities of the surface targets.

10. The method of claim 9, wherein the determining the surfacing zone is in further accordance with respective target-specific minimum distances.

11. The method of claim 1, wherein the controlling ascent of the UV to the periscope depth comprises:

delaying ascent, responsive to failure to detect, from the second data, a surfacing zone in which detected surface targets are absent at a time of the collecting.

12. The method of claim 1, wherein the magnetic sensor data comprises data from a first magnetic sensor that is configured to sense in an upward direction and a second magnetic sensor that is configured to sense in a downward direction.

13. The method of claim 1, wherein the active sonar data comprises data from a tiltable forward-looking sonar.

14. The method of claim 13, wherein the tiltable forward-looking sonar is configured to sense sound from at least 45 degrees above horizontal.

15. The method of claim 1, wherein the second data comprises:

a. data from a passive sonar associated with the UV, b. data from one or more magnetic sensors associated with the UV, and c. data from an active sonar associated with the UV.

16. A system of controlling ascent of an underwater vehicle (UV) from a safety depth to a water surface, the system comprising:

a processing circuitry, the processing circuitry including a processor and memory, and being configured to:

a) at the safety depth, control the UV to collect first data, from a first passive sonar associated with the UV, the first data being passive sonar indicative of first locations of surface targets within a first surface area of interest;

b) control ascent of the UV to an intermediate depth in accordance with, at least, the first data;

c) at the intermediate depth, control the UV to collect second data indicative of second locations of surface targets within a second surface area of interest, wherein the second data comprises one or more of:

a. passive sonar data from a second passive sonar associated with the UV, b. magnetic sensor data from one or more magnetic sensors associated with the UV, c. active sonar data from an active sonar associated with the UV, or d. data from-a-light detection and ranging (LIDAR) associated with the UVdata;

d) control ascent of the UV to a periscope depth in accordance with, at least, the second data, wherein: the safety depth is not less than 15 meters beneath the surface, the intermediate depth is not less than 5 meters below the surface, and the periscope depth is less than 8 meters below the surface.

17. A computer program product comprising a non-transitory computer readable storage medium retaining program instructions, which, when read by a processing circuitry, cause the processing circuitry to perform a computerized method of controlling ascent of an underwater vehicle (UV) from a safety depth to a water surface, the method comprising:

a) at the safety depth, controlling the UV to collect first data, the first data being passive sonar data indicative of first locations of surface targets within a first surface area of interest;

b) controlling ascent of the UV to an intermediate depth in accordance with, at least, the first data;

c) at the intermediate depth, controlling the UV to collect second data indicative of second locations of surface targets within a second surface area of interest, wherein the second data comprises one or more of:

a. passive sonar data, b. magnetic sensor data, c. active sonar data, or d. light detection and ranging (LIDAR) Vdata;

d) controlling ascent of the UV to a periscope depth in accordance with, at least, the second data, wherein: the safety depth is not less than 15 meters beneath the surface, the intermediate depth is not less than 5 meters below the surface, and the periscope depth is less than 8 meters below the surface.

* * * * *